United States Patent
Lodhia et al.

(10) Patent No.: US 10,838,698 B2
(45) Date of Patent: Nov. 17, 2020

(54) PROVIDING A REUSE CAPABILITY FOR VISUAL PROGRAMMING LOGIC WITHIN A BUILDING TOOL

(71) Applicant: salesforce.com, inc., San Francisco, CA (US)

(72) Inventors: Rahmaan Lodhia, Johns Creek, GA (US); Jeffrey Geiger, Denver, CO (US); Michael Diffenderfer, Atlanta, GA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/139,540

(22) Filed: Sep. 24, 2018

(65) Prior Publication Data

US 2020/0097262 A1 Mar. 26, 2020

(51) Int. Cl.
*G06F 9/44* (2018.01)
*G06F 8/36* (2018.01)
*G06F 8/34* (2018.01)
*G06F 8/41* (2018.01)
*G06F 16/901* (2019.01)

(52) U.S. Cl.
CPC .......... *G06F 8/36* (2013.01); *G06F 8/34* (2013.01); *G06F 8/433* (2013.01); *G06F 16/9024* (2019.01)

(58) Field of Classification Search
CPC .......... G06F 3/04845; G06F 8/41; G06F 8/34; G06F 8/71; G06F 8/44; G06F 8/451; G06F 11/362; G06F 9/4881; G06F 8/36; G06F 16/9024; H04L 67/1097; G06N 5/048
See application file for complete search history.

(56) References Cited

U.S. PATENT DOCUMENTS

| 5,577,188 | A | 11/1996 | Zhu |
| 5,608,872 | A | 3/1997 | Schwartz |
| 5,649,104 | A | 7/1997 | Carleton |
| 5,715,450 | A | 2/1998 | Ambrose et al. |
| 5,761,419 | A | 6/1998 | Schwartz |
| 5,819,038 | A | 10/1998 | Carleton |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |

(Continued)

*Primary Examiner* — Tuan A Vu
(74) *Attorney, Agent, or Firm* — Dergosits & Noah LLP; Todd A. Noah

(57) ABSTRACT

Described is a mechanism that provides the ability to reuse a portion of visual programming logic within an automation building tool. The programming logic may be represented as a directed acyclic graph (DAG) such that the nodes of the graph correspond to various operations and the edges of the graph correspond to the logic flow of the program. The mechanism may provide a new capability to reuse portions of the visual programming logic while adhering to the requirements of a DAG structure. For example, a user may copy a valid substructure of visual programming logic upon a validation the programming logic may be inserted into another portion of the DAG. Accordingly, the mechanism provides an efficient and user-friendly mechanism to reuse a portion of visual programming logic within an automation building tool.

20 Claims, 12 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0094646 A1* | 4/2007 | Higham .............. G06F 8/44 717/136 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0070721 A1* | 3/2010 | Pugh .................. G06F 8/71 711/162 |
| 2012/0102469 A1* | 4/2012 | Kapoor ............. G06F 11/362 717/129 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2015/0363702 A1* | 12/2015 | Baum ................ G06N 5/048 706/52 |
| 2016/0291942 A1* | 10/2016 | Hutchison ........... G06F 8/451 |
| 2017/0078392 A1* | 3/2017 | Gray ............... H04L 67/1097 |
| 2017/0098154 A1* | 4/2017 | Glendenning ......... G06F 8/34 |
| 2017/0147709 A1* | 5/2017 | Ganz ............. G06F 3/04845 |
| 2017/0344398 A1* | 11/2017 | Suzuki ............. G06F 9/4881 |
| 2018/0225100 A1* | 8/2018 | Cook ................. G06F 8/41 |

* cited by examiner

US 10,838,698 B2

PROVIDING A REUSE CAPABILITY FOR VISUAL PROGRAMMING LOGIC WITHIN A BUILDING TOOL

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This disclosure relates to a building tool, and more particularly, providing the ability to reuse visual programming logic within the building tool.

BACKGROUND

Various customer relationship management (CRM) software tools exist to aid organizations with managing interactions with customers and potential customers. These tools often include capabilities that allow an organization to create a program to automate various tasks. For example, these tools may be used to create a program to automate various marketing tasks. As one example, an automation builder may allow a user (e.g. marketing professional) to visually create a program for an automated email marketing campaign. Such an automation builder, however, may require a certain degree of programming acumen and effort. Moreover, a program created within the automation building tool may become fairly complex. For example, the program may involve complex logical branching that may be repeated within a program. Accordingly, such programming may become tedious and error prone. Thus, there is a need to further provide user-friendly capabilities and functionality that allow users to more efficiently build programs within a building tool.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
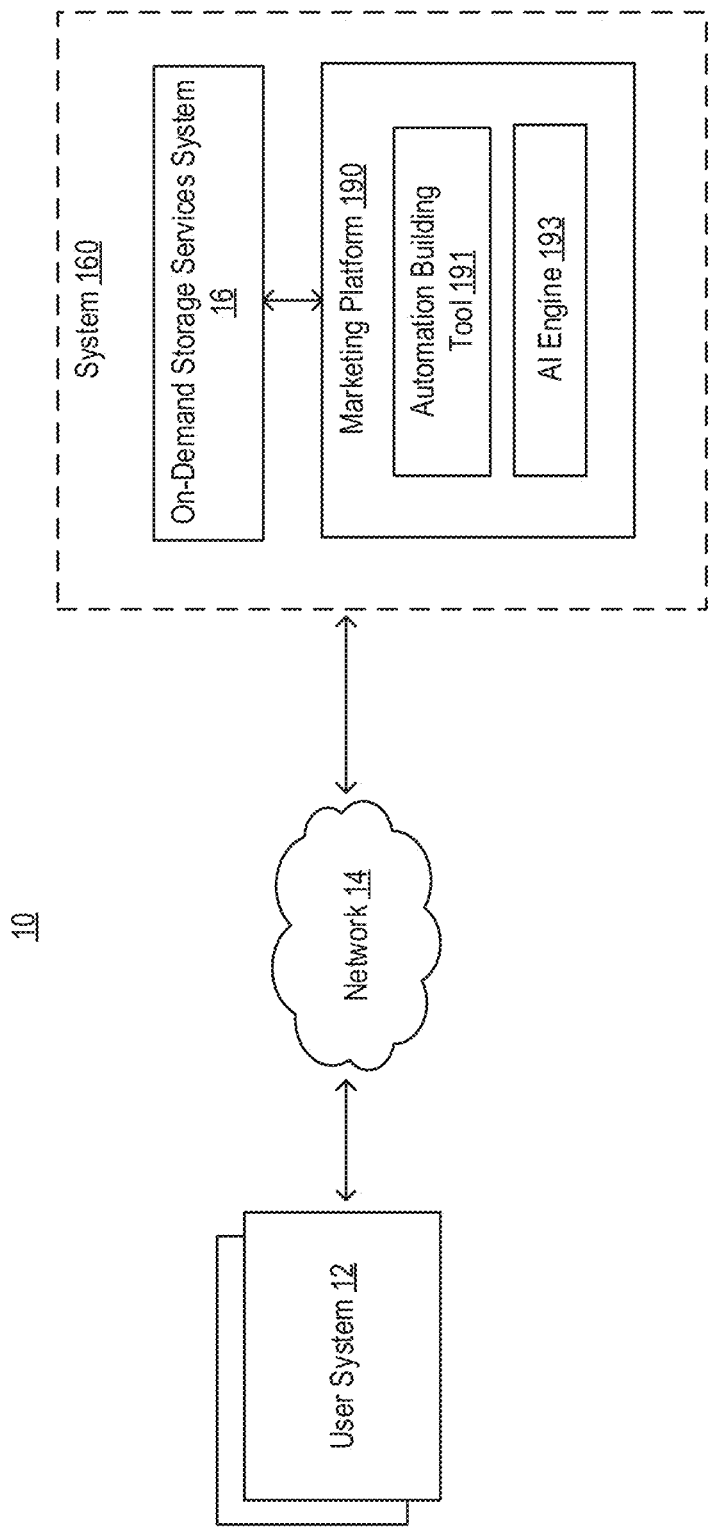
FIG. 1 is a block diagram illustrating an example of an operating environment for providing a reuse capability for visual programming logic within an automation building tool according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a mechanism that provides the ability to reuse a portion of visual programming logic within an automation building tool. As described, the mechanism may be used within an automation building tool (or automation builder) that provides a visual interface to create a program using visual components. For example, the programming logic may be represented as a directed acyclic graph (DAG) such that the nodes of the graph correspond to various operations and the edges of the graph correspond to the logic flow of the program. Accordingly, the user (or developer) may visually connect various operations and create a workflow as part of an automated program. For example, the workflow may be part of a marketing campaign such as an automated email marketing procedure. In some embodiments, the mechanism may provide a new capability to reuse portions of the visual programming logic while adhering to the requirements of a DAG structure. For example, a user may copy a valid substructure of visual programming logic for reuse upon a validation the programming logic may be inserted into another portion of the DAG.

In addition, the mechanism may provide an efficient validation process that further aids a user to select, copy, and insert (or paste) a portion of visual programming logic within a program. Accordingly, the mechanism may provide advantages over existing tools that merely provide a copy and paste functionality. For example, in some embodiments, the mechanism performs a validation (or partial validation) at the time the user selects operations to be copied. Accordingly, such a validation provides a degree of certainty that operations that are copied may be validly inserted (e.g. without error) into other portions of the process flow of the DAG. Such a feature may aid the user by providing an assurance that a copied portion of logic may be reused within the program without causing errors at the time of insertion. This in turn reduces user errors that may occur using a mere copy and paste functionality that is not concerned with validation until the time of insertion or testing.

In addition, in some embodiments, the mechanism may provide various interface elements (or visual cues) in conjunction with the unique validation process. In one aspect, the mechanism provides the ability to easily select elements of the DAG such as operations and also enables or disables the ability perform a copy option (e.g. button) based on the current validity of the selected operations. For example, the mechanism may enable the copy function only when a suitable combination of operations for copying are selected. In another aspect, the mechanism provides a convenient mechanism that allows the user to insert copied operations within a particular insertion point of the DAG. In some embodiments, the mechanism may also sanitize copied operations to further provide the ability to insert portions of logic within the DAG.

Accordingly, described is an efficient and user-friendly mechanism to reuse a portion of visual programming logic within an automation building tool. As further described herein, such a mechanism may be provided within an operating environment.

FIG. 1 is a block diagram illustrating an example overview of an operating environment 10 for providing a reuse capability for visual programming logic within an automation building tool according to one or more embodiments of the disclosure.

As shown, a general overview of operating environment 10 may include a user system 12, a system 160, which may include an on-demand database services system (or platform) 16, and a marketing platform 190, which may all interact via a network 14. The network may be any type of wired or wireless network including a local area network (LAN), a wide area network (WAN), or a direct communication link, or other suitable connection. It should be noted the marketing platform 190 and/or automation building tool 191 may be part of system 16.

As further described herein, system 16 may provide an on-demand database service to customers. As part of an on-demand service, the system 160 may also include a marketing platform 190 that may include one or more tools available to organizations. For example, the marketing platform may access customer data that may be stored as part of system 16. The marketing platform 190 may access such data and perform various tasks or analysis. In one embodiment, the marketing platform 190 may also include an artificial intelligence (AI) engine 193. As further described herein, an automation building tool 191 (or building tool, or builder, or tool) may provide the ability to create a program (or automated program) in a visual manner. For example, a user (or developer) may create visual programming logic represented as a directed acyclic graph (DAG) where nodes of the DAG represent various operations performed by a system. Accordingly, the building tool 191 may provide an interface for creating a program.

Figure 2:
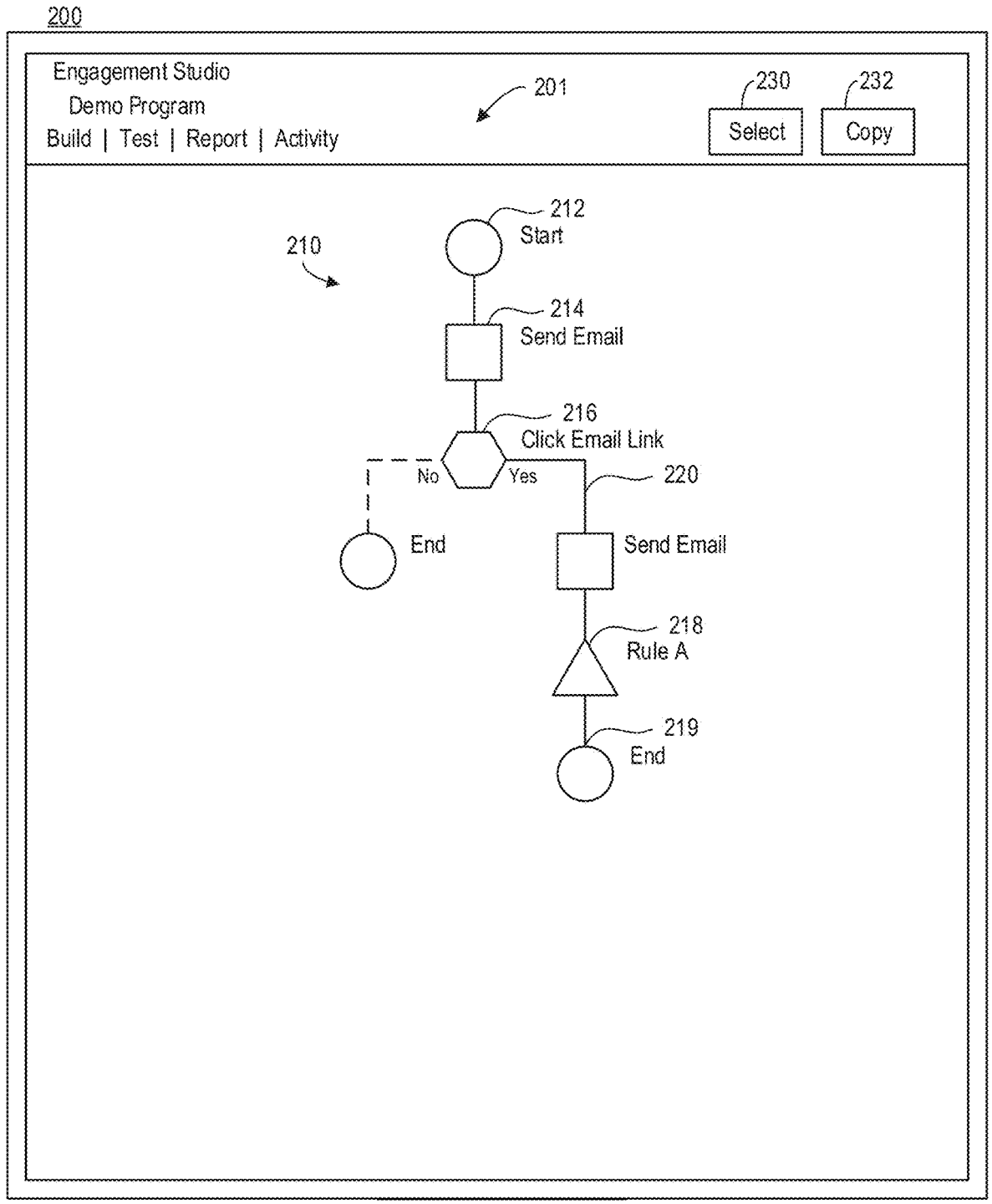
FIG. 2 is a diagram illustrating an example building tool interface for creating a program using visual programming logic according to one or more embodiments of the disclosure.

FIG. 2 is a diagram 200 illustrating an example building tool interface 201 for creating a program using visual programming logic according to one or more embodiments of the disclosure. As shown, automation building tool (e.g. automation building tool 191) may include and interface 201 that allows a user to visually create a program (e.g. "Demo Program" as shown in this example). For example, the program (or automation, or automated program) may provide an automated email marketing campaign. It should be noted that although the examples described herein relate to an automated email marketing procedure, any type of program or automation is contemplated.

As shown, the program or visual programming logic (or logic) may be represented as a DAG 210. Accordingly, in some embodiments, the program may adhere to a DAG flow structure (e.g. no cycles). It is contemplated, however, that other programming structures may be used. The DAG 210 may include a plurality of nodes that each correspond to a particular type of operation. As referred to herein, an operation may include a component of a program such as a method, function, task, procedure, etc. that may be performed by the system. When building or creating a program, a user may select operations (e.g. nodes) that are connected (e.g. via edges) to create a particular program that follows a logical flow that adheres to the structure of a DAG. In this example, the type of operations include a start operation 212, an action operation 214, a trigger operation, a rule operation 218, and a stop operation 219, which are connected (or joined) by one or more edges 220 that describe the program flow (or process flow).

In one embodiment, the operations may be selected from a specific set of available types of operations. For example, the building automation tool may provide a predefined set of types of operations. For example, as provided in this example related to an email marketing program, the predefined set of operations may include a start (or begin) operation, an action operation, a trigger operation, a rule operation, and a stop (or end) operation. A start operation may designate the start of a program path, and an end operation designate the end of a program path. An action operation may perform various actions at a given point in time. For example, in the context of an email marketing program, an action operation may include operations such as send an email, add a user/customer to a list, adjust a score associated with a user/customer, and any other actions. A trigger operation may wait (or listen, monitor, etc.) for a particular event (or characteristic, action, etc.). In addition, the trigger operation may act as a decision tree where the program path (or logic flow) may split based on the occurrence of a particular event (e.g. yes/no decision tree). For example, the trigger operation may listen for an event such as opening an email, clicking an email link 216, submitting a form within a specified number of days, or any other events. A rule may check for specified criteria or values within the system. For example, a rule operation may check or verify a particular field related to a customer (e.g. prospect). As shown, in some embodiments, each type of operation may correspond to a particular node shape (e.g. circle, square, hexagon, triangle, etc.). It should be noted that other indicators (e.g. colors) may also be used to distinguish between operations and types of operations.

In some embodiments, the interface may also include various modes of operations. Accordingly, a user may interact with the building tool (or interface) by switching between various modes. For example, the building tool may include a build-mode (e.g. as shown in diagram 200) that allows a user to add, delete, and modify operations, as well as perform other operations that may be part of a program creation process. In addition, the building tool may include a select-mode (e.g. as shown in diagram 300 and as further described herein) that limits the functionality to allowing the user to only select one or more operations (e.g. disables the ability to add, delete, or modify operations). Accordingly, with such embodiments, the interface may include an indicator that specifies the current mode (e.g. tab, highlighted button, etc.). It should be noted that a "build" and a "select" mode are provided merely as examples and other nomenclature for substantially equivalent modes are contemplated. In this example, the user may select modes via one or more selection options. For instance, as shown, the options may include a select option 230 and a copy option 232. Once a user provides an input to select one or more operations (e.g. via the selection option 230), the user may be provided with the ability to select (or specify) particular operations (e.g. a portion of visual programming logic) as shown in FIG. 3.

Figure 3:
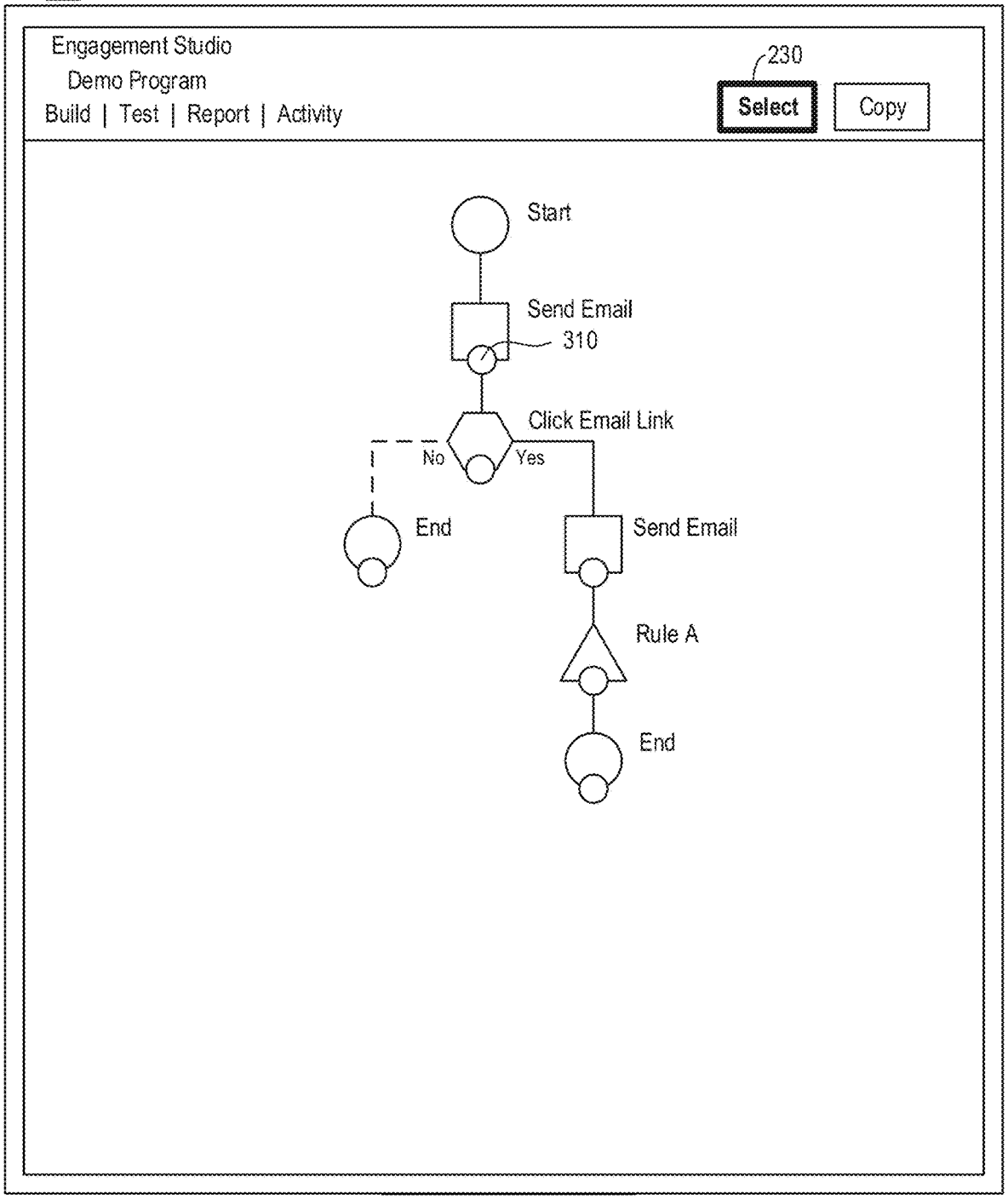
FIG. 3 is a diagram illustrating an example interface allowing a user to select one or more operations of visual programming logic according to one or more embodiments of the disclosure.

FIG. 3 is a diagram 300 illustrating an example interface allowing a user to select one or more operations of visual programming logic according to one or more embodiments of the disclosure. As shown in this example, each of the operations may provide an operation-specific select option 310 to allow the user to select particular operations (e.g. nodes). As described, in one embodiment, the operation-specific selection option 310 may be provided when the tool is in a select-mode. As shown, the select-mode may limit the user to only selecting particular operations and disable various other options such as adding elements. In response to selecting a particular operation, the interface may provide an indication that an operation is selected (e.g. "X" mark) as shown in FIG. 4.

Figure 4:
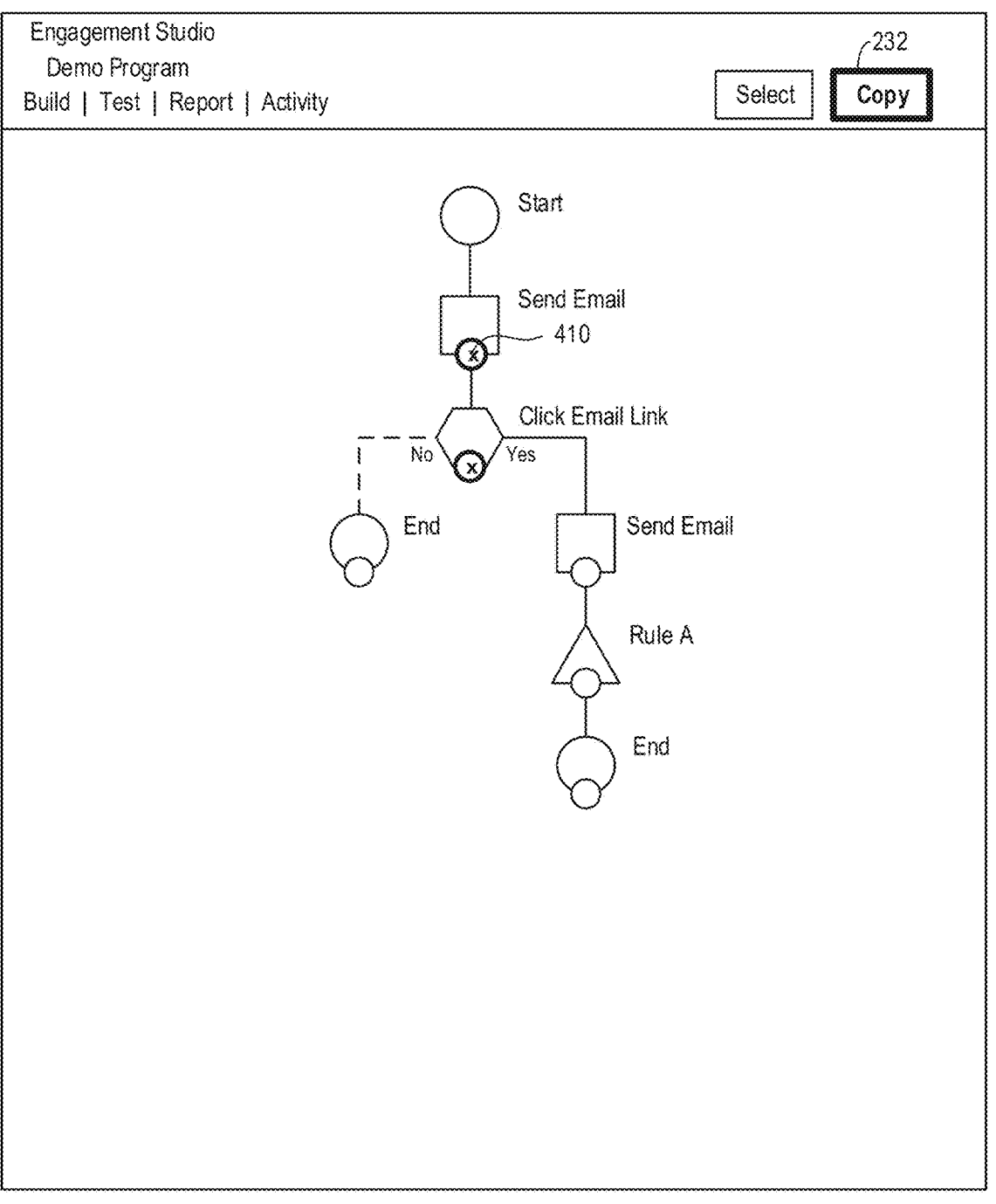
FIG. 4 is a diagram illustrating an example interface in response to a user selecting one or more operations of visual programming logic according to one or more embodiments of the disclosure.

FIG. 4 is a diagram 400 illustrating an example interface in response to a user selecting one or more operations of visual programming logic according to one or more embodiments of the disclosure. As shown in this example, a set of operations (e.g. visual programming logic) have been selected. For example, as shown, the interface may provide an indication 410 that a particular operation is selected (e.g. via an "X" indicator). Upon a determination of a valid selection of one or more operations, the tool may allow the user to select the copy option 232 as shown in this example. As further described herein, the system may only enable a copy functionality (e.g. copy option 232) once the tool determines a valid set of operations is selected. Once a user selects the copy option 232, the tool may copy the selected operations (e.g. portion of visual programming logic) for later use. As described, the user may store portions of programming logic upon a validation. In one embodiment, the stored portion of programming logic may be reused within the particular program. For example, the copied portion of programming logic may be stored to a clipboard. In addition, the copied programming logic may be stored as part of a repository that may be accessed during the creation of other programs by the same or other users.

In one embodiment, the tool may switch back to a build-mode in response to a user selecting the copy option 232. Accordingly, the system may allow the user to paste (or reuse) the copied operations. For example, the tool may allow the user to insert the copied operations at an insertion point within the DAG as shown in FIG. 5.

Figure 5:
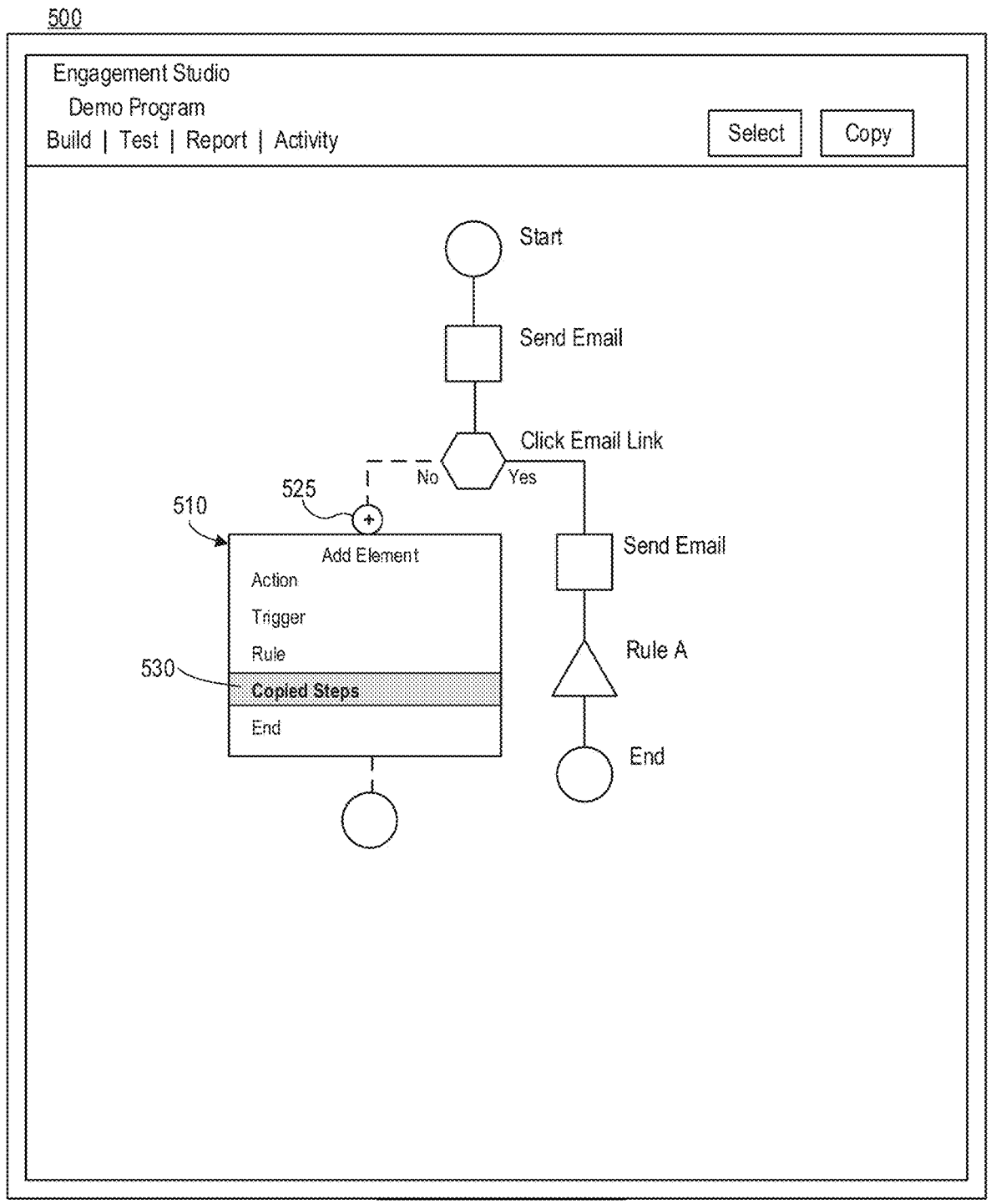
FIG. 5 is a diagram illustrating an example interface providing an option to insert one or more copied operations of visual programming logic according to one or more embodiments of the disclosure.

FIG. 5 is a diagram 500 illustrating an example interface providing an option to insert (or paste) one or more copied operations of visual programming logic according to one or more embodiments of the disclosure. Once a user has successfully copied one or more portions of programming logic, the user may be provided with the ability to paste such programming logic within the DAG 210. As shown, the tool may provide a menu (or listing) 510 of a list of one or more elements that may be added to the DAG 210. In one embodiment, the menu 510 may be provided in response to a user selecting an insertion point within the DAG. For example, edges of the DAG may provide a selectable insertion point 525, which when selected (or clicked) may display the menu 510. As shown in this example, the menu 510 may include options to add one or more elements (e.g. operation types) and an option to paste a copied portion of programming logic 530. In response to selecting the option to paste the copied portion of programming logic 530, the system may insert (or paste) of copied portion of programming logic. Once the copied portion of programming logic is selected, the tool may insert the portion at the specified insertion point within the DAG as shown in FIG. 6.

Figure 6:
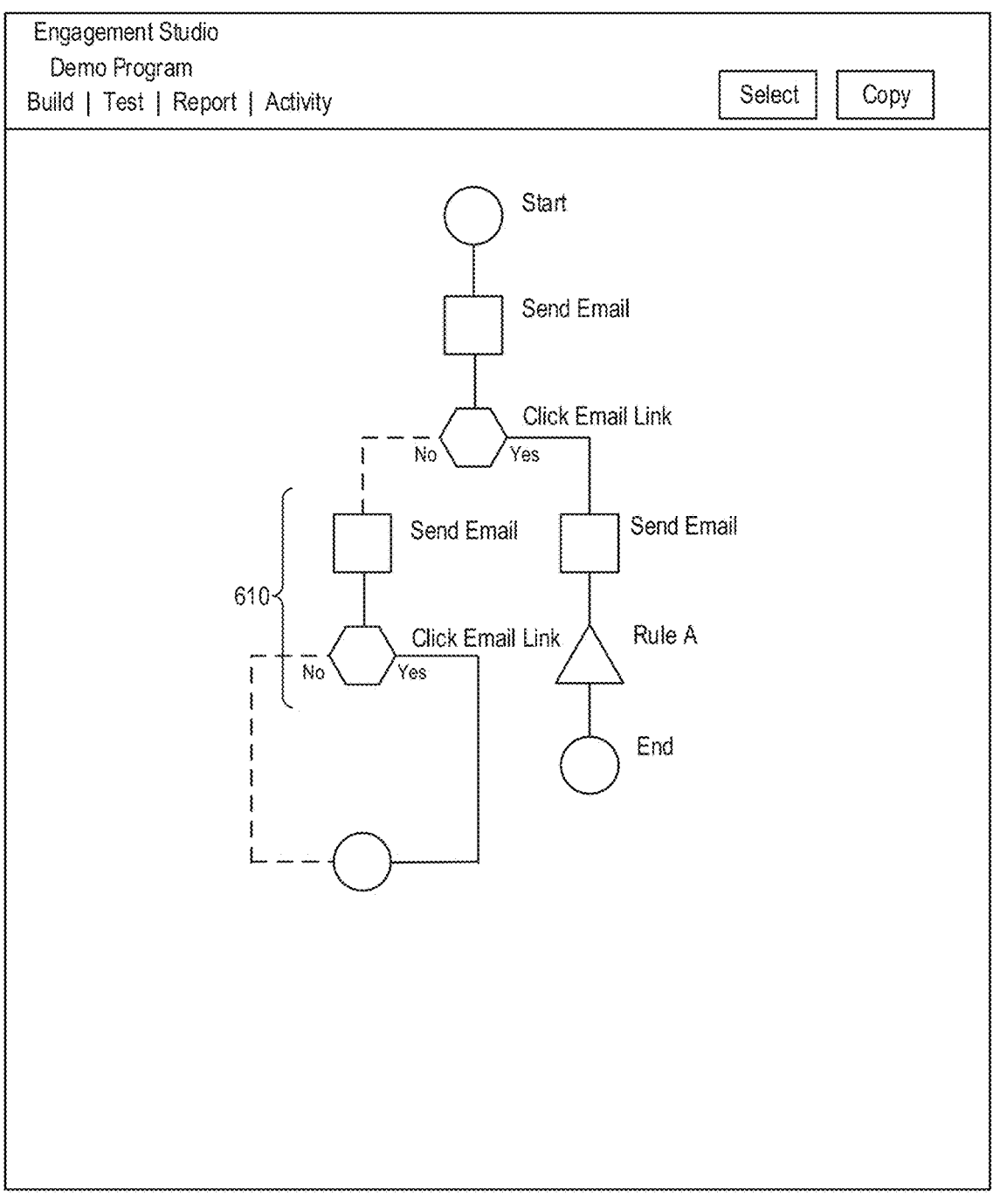
FIG. 6 is a diagram illustrating an example interface after inserting a previously copied portion of visual programming logic according to one or more embodiments of the disclosure.

FIG. 6 is a diagram 600 illustrating an example interface after inserting a previously copied portion of visual programming logic into a program according to one or more embodiments of the disclosure. As shown, the previously copied portion of programming logic 610 is now inserted (or pasted) into the DAG. Accordingly, as shown in the above-described example, the user has successfully reused a portion of programming logic with a limited number of inputs (e.g. clicks). Moreover, because the tool validates a portion of logic at the time of selection, the user has a high degree of certainty that the programming logic may be pasted anywhere within the DAG.

Figure 7:
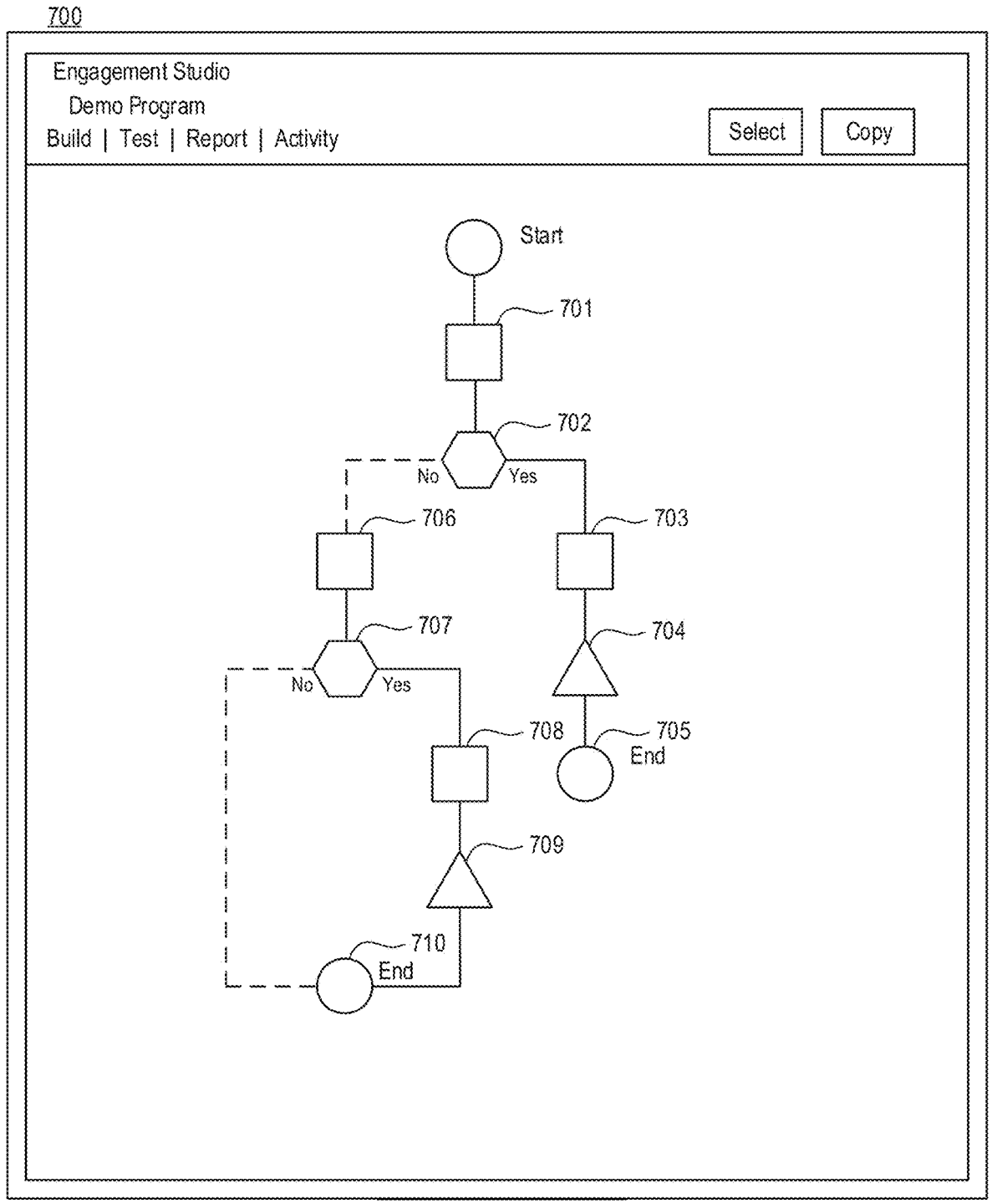
FIG. 7 is a diagram illustrating an example of a program after inserting copied portions of visual programming logic according to one or more embodiments of the disclosure.

FIG. 7 is a diagram 700 illustrating an example of a program after inserting copied portions of visual programming logic according to one or more embodiments of the disclosure. As described, the system may perform a validation of a current selection of operations. In one embodiment, the system may determine whether the selected set of operations (e.g. portion of visual programming logic) is valid based on one or more rules or criteria. In one embodiment, the validity determination may be based on a combination of a set of rules. For example, as a first rule, the system may determine whether the current selection of operations includes only one open source (or entry path). As a second rule, the system may determine whether the current selection includes only one open destination (or exit path). As a third rule, the system may determine whether the operations of the current selection are connected, or a comprises a single structure (e.g. not a disconnected set of nodes). As a fourth rule, the system may determine whether the number of selected operations is within a predefined limit. Accordingly, the system may determine whether a selected set of one or more operations is valid as a reusable portion of programming logic based on a combination of such rules. For example, the system may determine the selected set of operations are valid if the first to third rules are satisfied, or if all four rules are satisfied, etc.

To further illustrate, FIG. 7 may be referenced. As shown in this example, the program may include operations 701-710. The following are examples of various combinations of operations that the system may determine to be valid according to some embodiments. As a first example, a user selection of any one of the operations (or nodes) would be a valid selection. As a second example, a set of linear operations with a single entry and a signal exit would be a valid selection (e.g. operations 701 and 702, or operations 703 and 704, etc.). As a third example, a set of operations with multiple same exits would be a valid selection (e.g. operations 706, 707, 708, and 709, see e.g. 707 and 709 having the same exits). As a fourth example, a set of operations including a branching with an end operation and a single entry and exit would be a valid selection (e.g. operations 702, 703, 704, and 705, or operations 702, 703, 704, 705, and 706).

As described, the system may also determine certain combinations of selected operations are invalid as a reusable portion programming logic. The following are examples of various combinations of operations that the system may determine to be invalid according to some embodiments. As a fifth example, a set of operations that are disconnected would be an invalid selection (e.g. operations 701, 703, and 704, or operations 701, 707, 708, and 709). As a sixth example, a set of operations that are linear but with no exit would be considered invalid (e.g. operations 703, 704 and 705, or operations 707, 708, 709, and 710). Accordingly, as described, the system may use a unique process for validating a portion of programming logic in order to provide the reuse mechanism as described herein.

Figure 8:
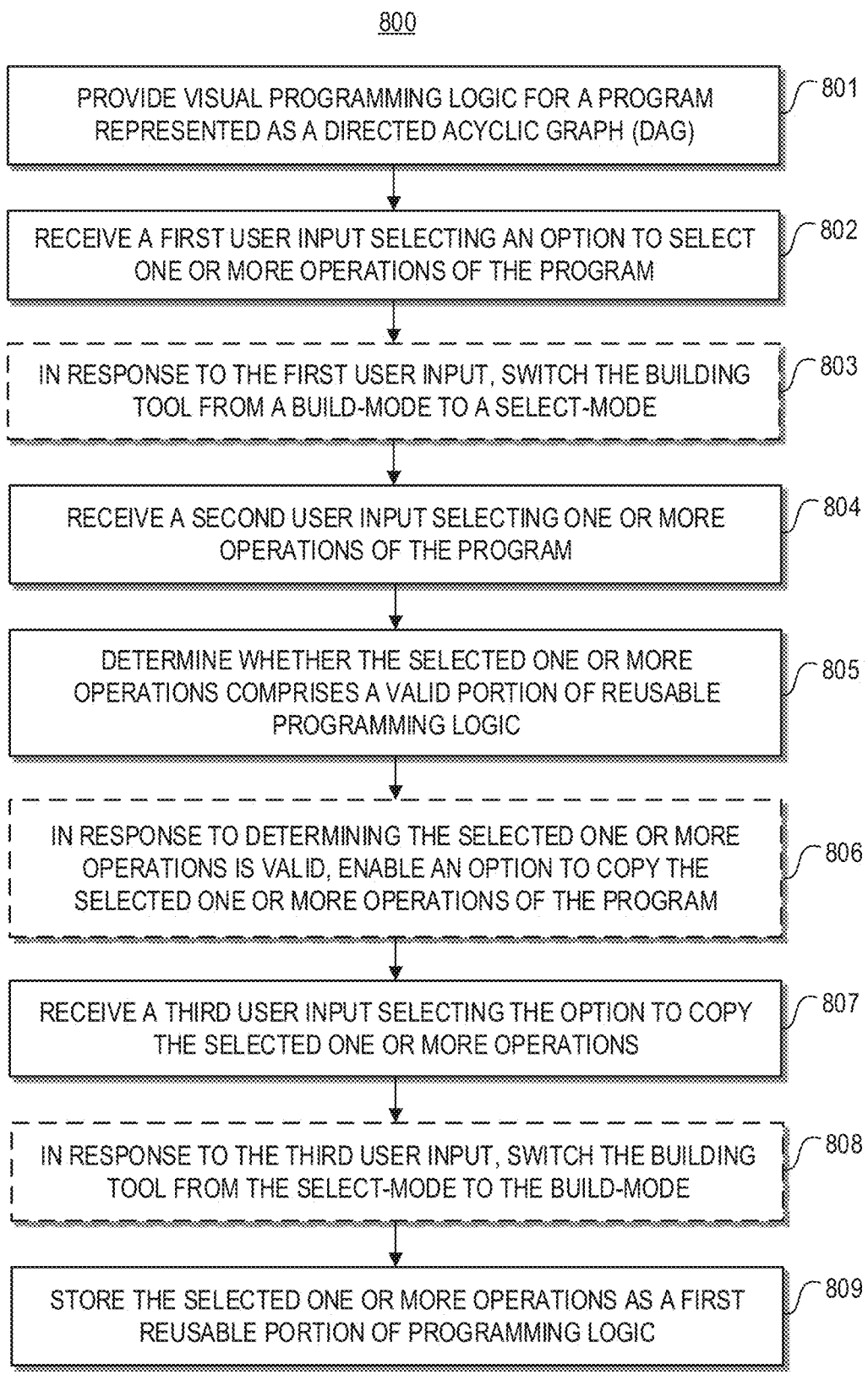
FIG. 8 is a process flow diagram illustrating an example method of copying one or more operations of visual programming logic of a program within an automation building tool according to one or more embodiments of the disclosure.

FIG. 8 is a process flow diagram 800 illustrating an example method of copying one or more operations of visual programming logic of a program according to one or more embodiments of the disclosure. Process 800 may use processing logic, which may include software, hardware, or a combination thereof. For example, process 800 may be performed by a system including one or more components described in the operating environment 100 (e.g. system 16, or automation building tool 191).

In 801, the system may provide, within the automation building tool, visual programming logic for a program. As described, the visual programming logic may be represented as a directed acyclic graph (DAG) including one or more nodes each representing an operation to be performed by the system. In one embodiment, the one or more operations of the program may perform an automated email marketing procedure. For example, the one or more operations may include one or more of a start operation, action operation, trigger operation, rule operation, and an end operation.

In some embodiments, the automation building tool may work in conjunction with one or more APIs or services. For example, a selection service (or API) may provide functionality with respect to selecting and indicating which operations are currently selected. In addition, a copy service (or API) may provide functionality related to copying or reusing various operations and may perform a validation process as described herein.

In 802, the system may receive, via the automation building tool, a first user input selecting an option (e.g. selection option 230) to select one or more operations of the program. In one embodiment, the system may interact with the selection service to initialize a selection data store (e.g. selection array) in response to a user selecting the selection option 230

In 803, in response to the first user input, the system may switch the automation building tool from a build-mode to a select-mode. In one embodiment, the build-mode may allow the user to at least add or delete operations, and the select-mode may limit the user to only select one or more operations.

In 804, the system may receive, via the automation building tool, a second user input selecting (e.g. via the operation-specific selection option 310) one or more operations of the program. In one embodiment, in response to each selection, the system may append or remove various operations from the selection array data store that may be managed by the selection service.

In 805, the system may determine whether the selected one or more operations comprises a valid portion of reusable programming logic. In one embodiment, the system may perform such a determination after each selection of the one or more operations. For example, if the user selects three operations, the validation may occur after selecting the first, second, and third operation. Accordingly, if the combination of selected operations is invalid after the third operation, the system may disable the copy option (e.g. copy option 232); however, if the combination of selected operations is valid after selecting a fourth operation, the copy option may then be enabled. Accordingly, the system may provide an on-the-fly, or real-time (or near real-time) validation of the selected operations to provide immediate feedback to the user with respect to whether such a portion of programming logic may be reused. Alternatively, in one embodiment, the system may determine whether the selected set of operations is valid in response to (or after) a user selecting the copy option (e.g. copy option 232). In one embodiment, the selected operation may be copied to a clipboard, and the system may interact with the copy service. In one embodiment, the copy service may perform the validation process of the selected operations.

As described, the system may determine whether the selected operations are a valid portion of reusable programming logic based on various criteria or rules as described above with reference to FIG. 7. In one embodiment, the system may determine the selected or more operations comprise a valid portion of reusable programming logic based on an entry path or an exit path of the selected one or more operations.

In one embodiment, the system may validate a portion of reusable programming logic in response to determining the selected one or more operations include a single entry path and a single exit path within the DAG. In addition, in one embodiment, the system may validate a portion of reusable programming logic in response to determining a plurality of the selected operations include a single exit path within the DAG.

In one embodiment, the system may invalidate a portion of reusable programming logic in response to determining at least a first operation and a second operation of the selected one or more operations are disconnected. For example, if the process flow is broken or includes any gaps the system may deem such a selection as invalid. As another example, if the selected portion of programming logic does not include an exit path, the system may determine the selected portion of programming logic is invalid. In addition, in response to determining the current selection of the one or more operations comprises the invalid portion of reusable programming logic, the system may disable, or maintaining as disabled, the option to copy the selected one or more operations of the program.

In 806, in response to determining the selected one or more operations comprises a valid portion of reusable programming logic, the system may enable an option to copy the selected one or more operations of the program (e.g. enable copy option 232).

In 807, the system may receive, via the automation building tool, a third user input selecting the option to copy (e.g. copy option 232) the selected one or more operations. In one embodiment, the system may provide a message (e.g. "toast" message or notification) indicating that the copy was successful. For example, the copy service may provide such indication.

In 808, in response to the third user input, the system may switch the automation building tool from the select-mode to the build-mode.

In 809, the system may store the selected one or more operations as a first reusable portion of programming logic. When storing the copied operations, the system may remove (or delete, or clear out) any unnecessary data associated with the operations to prepare them for insertion. For example, the system may remove one or more parameters associated with the selected stored operations.

Figure 9:
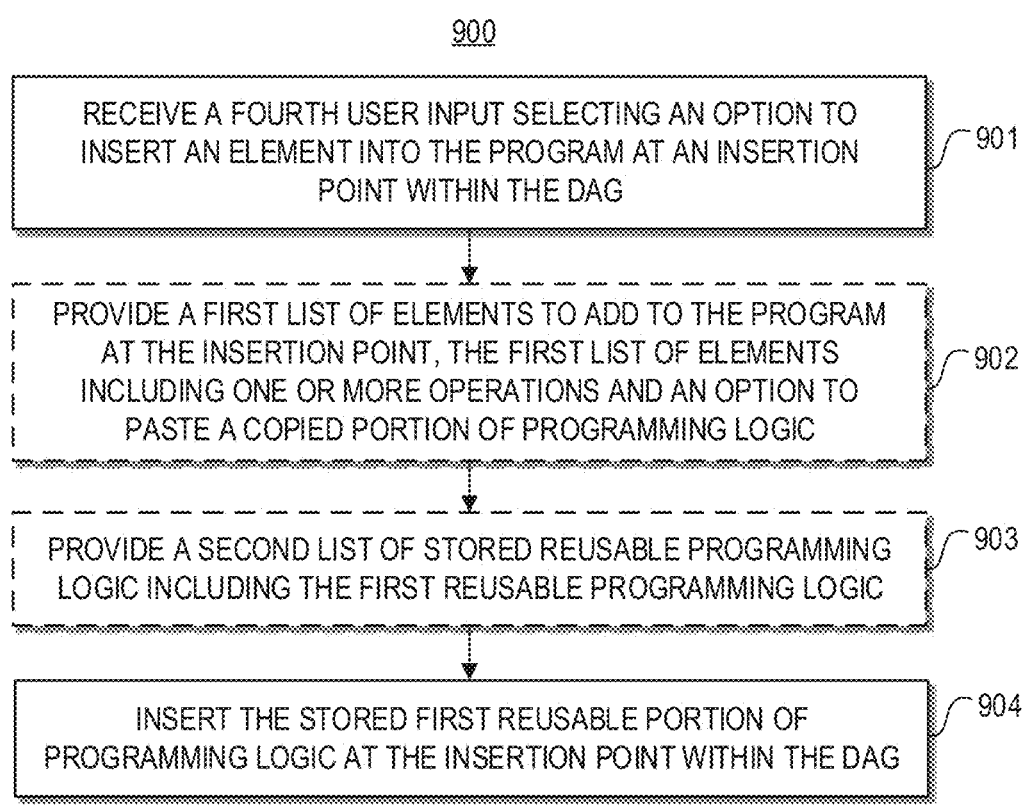
FIG. 9 is a process flow diagram illustrating an example method of inserting one or more previously copied operations of visual programming logic of a program within an automation building tool according to one or more embodiments of the disclosure.

FIG. 9 is a process flow diagram 900 illustrating an example method of inserting one or more previously copied operations of visual programming logic within a program according to one or more embodiments of the disclosure. Process 900 may use processing logic, which may include software, hardware, or a combination thereof. For example, process 900 may be performed by a system including one or more components described in the operating environment 100 (e.g. system 16, or automation building tool 191).

In 901, the system may receive, via the automation building tool, a fourth user input selecting an option to insert an element into the program at an insertion point within the DAG.

In 902, in response to the fourth user input, the system may provide a first list (e.g. menu 510) of elements to potentially add to the program at the insertion point. In one embodiment, as shown in FIG. 5, the first list of elements may include one or more types of operations, and an option to paste a copied portion of programming logic (e.g. menu item 530).

In 903, in response to receiving a user input selecting the option to paste (or insert) the copied portion programming logic, the system may provide a second list of stored reusable programming logic including the first reusable programming logic. In one embodiment, in response to receiving an option to paste programming logic, the system may provide a request that the operations be copied from a particular location. For example, the system may interact with the copy service to provide a location, source, destination, and information related to the positioning of the insertion point. In response, the copy service may retrieve the set of selected operations, and in one embodiment, transform the set of operations to a particular data structure (e.g. JSON). This transformed data may then be provided to backend database (or database API) as a request to be processed. In response to authenticating the request, the database may iterate through the data structure and add each operation to the underlying data store. Upon a successful request, the copy service may provide a resulting data structure to be included within the program. In one embodiment, the system may remove any unnecessary data from the operations to be inserted and may draw new edges (or paths) that correspond to the specified insertion point.

In 904, in response to receiving a user input selecting the stored first reusable programming logic, the system may insert the stored first reusable portion of programming logic at the insertion point within the DAG. In one embodiment, the system may provide a message (e.g. "toast" message or notification) indicating that the insertion was successful.

Accordingly, some embodiments described above, provides an efficient and user-friendly mechanism to reuse a portion of visual programming logic within an automation building tool. As described, embodiments may be used in conjunction with an on-demand database service.

Figure 10:
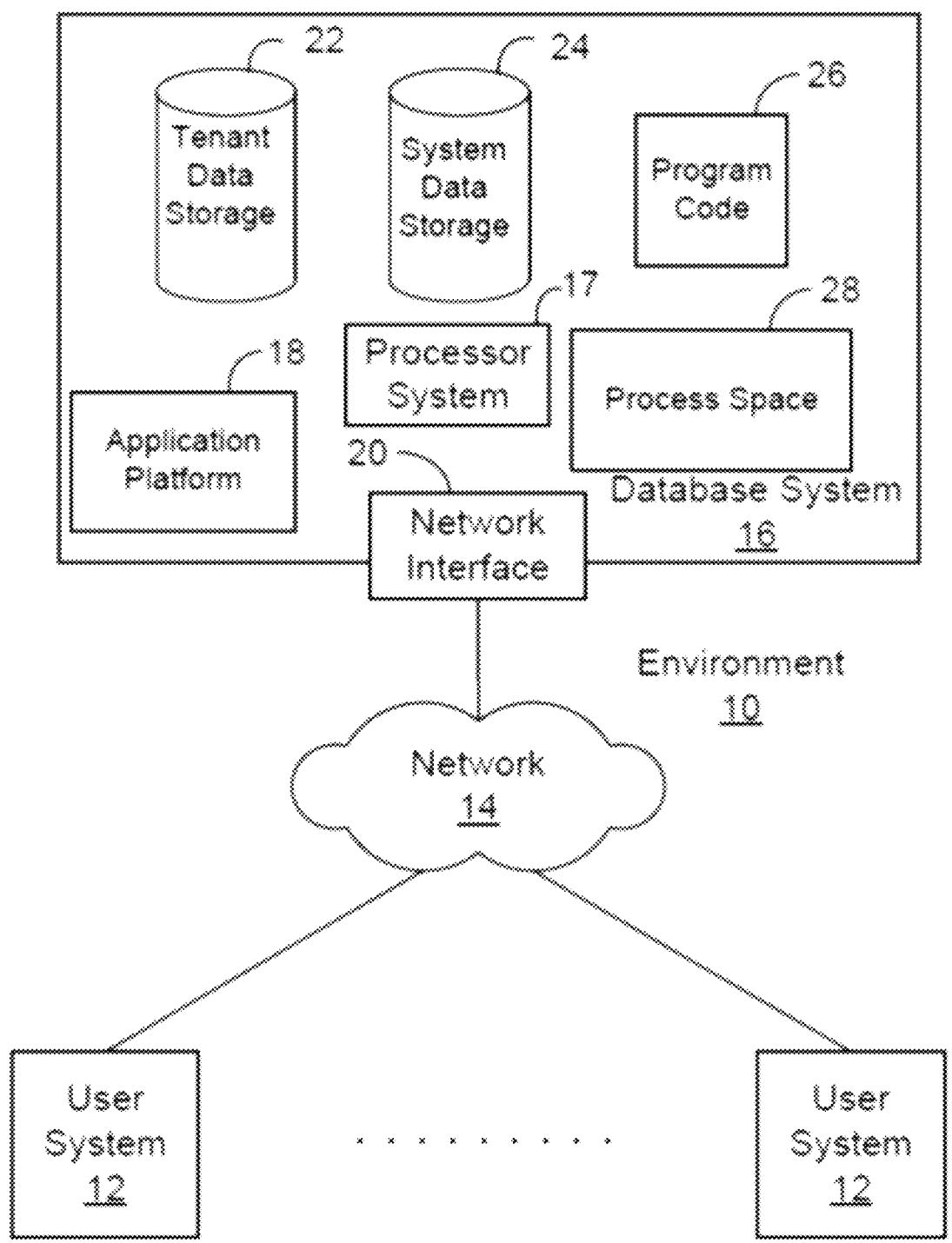
FIG. 10 is a block diagram illustrating of an example environment in which on-demand database services may be used in conjunction with one or more embodiments of the disclosure.

FIG. 10 is a block diagram illustrating of an example environment 10 in which on-demand database services may be provided to be used in conjunction with one or more embodiments of the disclosure.

Environment 10 may include user systems 12, network 14, database system 16, processor system 17, application platform 18, network interface 20, tenant data storage (or data store) 22, system data storage (or data store) 24, program code 26, and process space 28. In other embodiments, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 10 (and in more detail in FIG. 11) user systems 12 might interact via a network 14 with an on-demand database service, which is implemented in the example of FIG. 10 as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). A non-relational database management system (NRDBMS) or the equivalent may execute storage and fast retrieval of large sets of information against the database object(s). Application platform 18 may be a framework that allows the applications of system 16 to run, such as the hardware and/or software, e.g., the operating system. In some embodiments, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system

16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some embodiments, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one embodiment, system 16, shown in FIG. 10, implements a web-based CRM system. For example, in one embodiment, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

In one embodiment, an arrangement for elements of system 16 may include a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 10 include conventional, well-known elements that are explained only briefly here. For example, each user system 12 could include a personal computer, server, smart phone, or any wireless access protocol (WAP) enabled device or any other computing device capable of interfacing directly or indirectly to the Internet or other network connection. The term "computing device" is also referred to herein simply as a "computer". User system 12 may run an HTTP client, e.g., a browsing program or "browser", or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such a smart watch or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one embodiment, each user system 12 and all of its components are operator configurable using applications, such as a browser. Similarly, system 16 (and additional instances of an MTS, where more than one is present) and all of its components might be operator configurable using applications using processor system 17, which include one or more processors. Non-transitory computer-readable media as further described herein can have instructions stored thereon/in, that can be executed by or used to program a computing device to perform any of the methods of the embodiments described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or any other type of computer-readable medium or device suitable for storing instructions and/or data. Additionally, the entire program code, or portions thereof, may be transmitted and downloaded from a source over a network connection. It will also be appreciated that computer code for the disclosed embodiments can be realized in any programming language that can be executed on a client system and/or server or server system such as, for example, C, C++, HTML, any other markup language, Java, JavaScript, ActiveX, any other scripting language, such as VBScript, and many other programming languages as are well known may be used.

According to some embodiments, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 11:
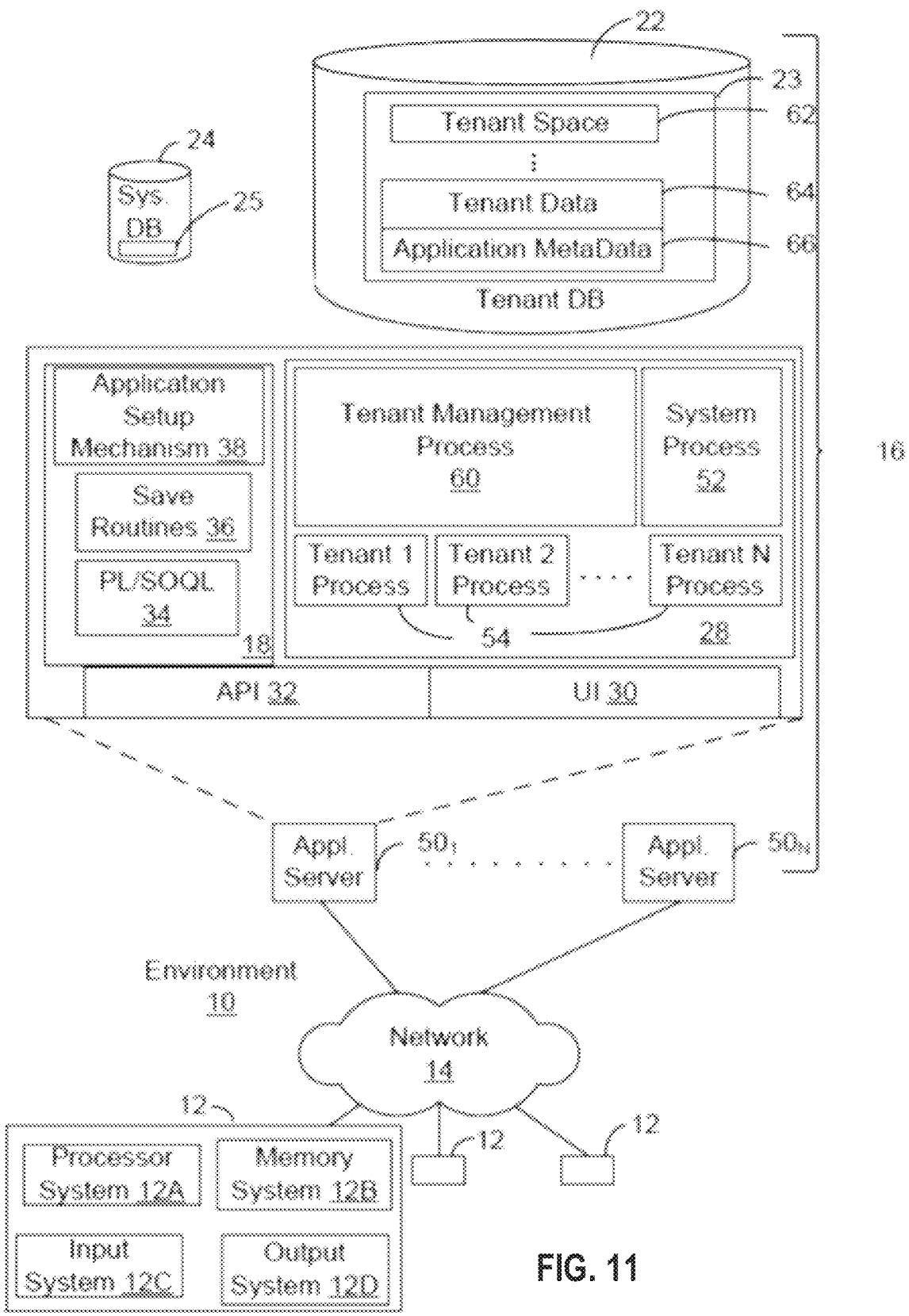
FIG. 11 is a block diagram illustrating an of example of elements of FIG. 10 and various possible interconnections between these elements according to one or more embodiments of the disclosure.

FIG. 11 is a block diagram illustrating an of example of elements of FIG. 10 and various possible interconnections between these elements according to one or more embodiments of the disclosure.

FIG. 11 also illustrates environment 10. However, in FIG. 11 elements of system 16 and various interconnections in some embodiments are further illustrated. FIG. 11 shows that user system 12 may include processor system 12A, memory system 12B, input system 12C, and output system 12D. FIG. 11 shows network 14 and system 16. FIG. 11 also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers 501-50N, system process space 52, tenant process spaces 54, tenant management process space 60, tenant storage space 62, user storage 64, and application metadata 66. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 10. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 11, system 16 may include a network interface 20 (of FIG. 10) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® or HBase databases.

Figure 12:
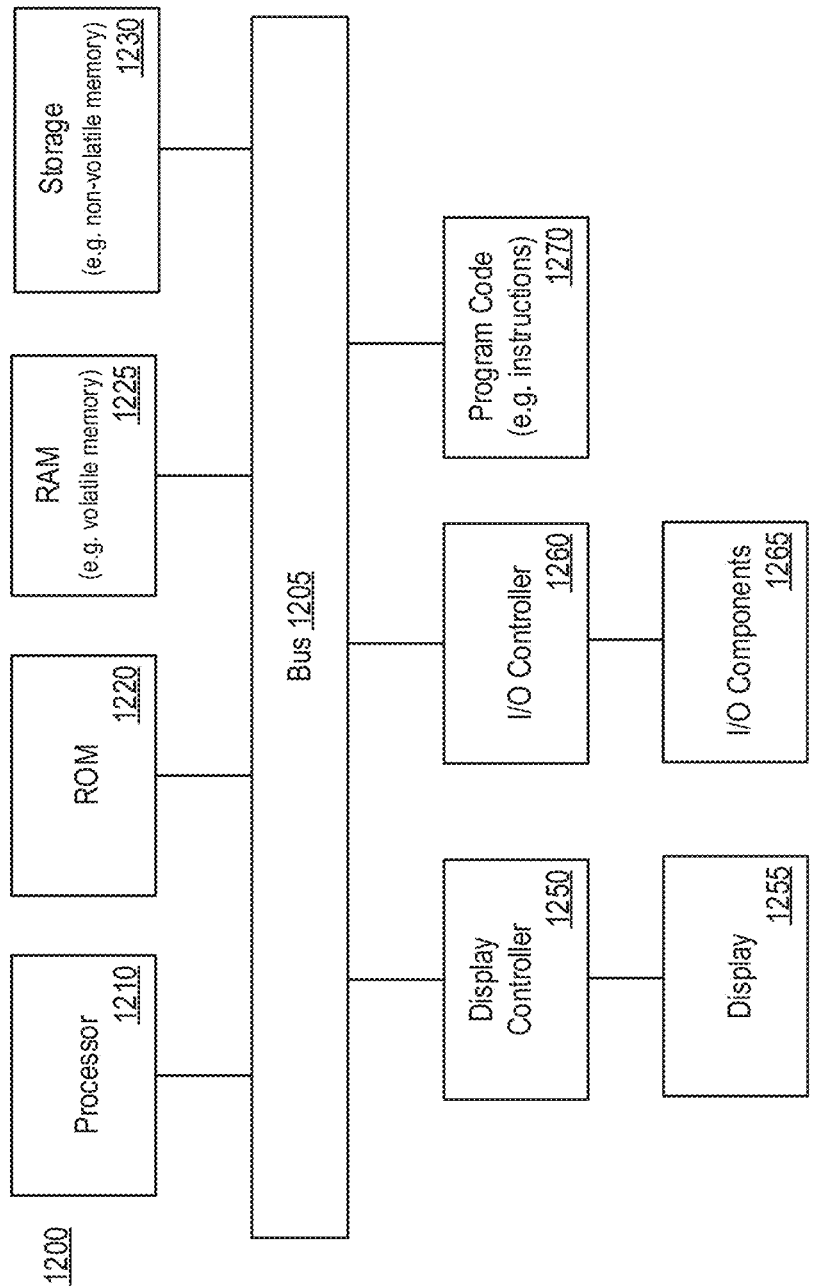
FIG. 12 is a block diagram illustrating an example of a computing system that may be used in conjunction with one or more embodiments of the disclosure.

FIG. 12 shows a block diagram of an example of a computing system that may be used in conjunction with one or more embodiments. For example, computing system 1200 (or system, or server, or computing device, or device) may represent any of the devices or systems (e.g. system 160, system 16, automation building tool 191, etc.) described herein that perform any of the processes, operations, or methods of the disclosure. As referred to herein, a system, for example, with reference to the claims, may include one or more computing systems that may include one or more processors. Note that while the computing system 1200 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to a processor 1210, ROM (Read Only Memory) 1220, RAM (or volatile memory) 1225, and storage (or non-volatile memory) 1230. The processor (or processors) 1210 may retrieve stored instructions from one or more of the memories 1220, 1225, and 1230 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein. As referred to herein, for example, with reference to the claims, a processor may include one or more processors. The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Program code 1270 may represent any of the instructions, applications, software, libraries, toolkits, modules, components, engines, units, functions, logic, etc. as described herein. Program code 1270 may reside, completely or at least partially, within the memories described herein (e.g. non-transitory computer-readable media), or within a processor during execution thereof by the computing system. Program code 1270 may include both machine code, such as produced by a compiler, and files containing higher-level or intermediate code that may be executed by a computing system or other data processing apparatus (or machine) using an interpreter. In addition, program code 1270 can be implemented as software, firmware, or functional circuitry within the computing system, or as combinations thereof. Program code 1270 may also be downloaded, in whole or in part, through the use of a software development kit or toolkit that enables the creation and embodiment of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g., and/or) unless otherwise specified.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising: one or more processors; and
a non-transitory computer readable medium storing a plurality of instructions, which when executed, cause the one or more processors to:
create, within a visual interface of an automation building tool, visual programming logic for a program, the visual programming logic represented as a directed acyclic graph (DAG) including a plurality of nodes, each node representing an operation to be performed by the program, the nodes being coupled together by edges to form a logical workflow, the visual programming logic being created in response to user selections of the nodes and edges;
receive, via the visual interface of the automation building tool, a first user input and a second user input, each input selecting an option displayed within the DAG to select one or more nodes of the DAG;
determine, in response to each user input, whether a combination of the selected nodes comprises a valid portion of reusable programming logic, the combination comprising all selected nodes of the DAG, and where validity of the combination is automatically determined based on applying a rule to the combination of selected nodes;
enable an interactive option to copy the combination of selected nodes of the program on the visual interface only in response to determining that the combination of selected nodes is valid based on the applied rule;
receive, via the automation building tool, a third user input on the visual interface selecting the enabled option to copy the selected nodes; and store the selected nodes as a first reusable portion of programming logic.

2. The system of claim 1, the plurality of instructions when executed further causing the one or more processors to:
switch the automation building tool from a build-mode to a select-mode, the build-mode allowing the user to at least add or delete operations, and the select-mode limiting the user to only select one or more operations in response to the first user input; and
switch the automation building tool from the select-mode back to the build-mode in response to the third user input.

3. The system of claim 1, the plurality of instructions when executed further causing the one or more processors to:
receive, via the automation building tool, a fourth user input selecting an option to insert an element into the program at an insertion point within the DAG; and
insert the stored first reusable portion of programming logic at the insertion point within the DAG in response to receiving a fifth user input selecting the stored first reusable programming logic.

4. The system of claim 3, the plurality of instructions when executed further causing the one or more processors to:
provide, in response to the fourth user input, a first list of elements to add to the program at the insertion point, the first list of elements including one or more operations and an option to paste a copied portion of programming logic; and
cause a second list of stored reusable programming logic including the first reusable programming logic to be displayed in response to receiving a sixth user input selecting the option to paste the copied portion of programming logic.

5. The system of claim 1, wherein
rule is based on an entry path or an exit path of the combination of the selected nodes.

6. The system of claim 5, wherein the applying the rule based on the entry path or the exit path includes:
determining that the combination of the selected nodes includes a single entry path and a single exit path within the DAG.

7. The system of claim 5, wherein the applying the rule based on the entry path or the exit path includes:
determining that the combination of the selected nodes includes a single exit path within the DAG.

8. The system of claim 1, wherein the applying the rule includes:
determining at least a first operation and a second operation of the selected nodes are disconnected; and
determining a current selection of the nodes comprises an invalid portion of reusable programming logic in response to determining at least the first operation and the second operation of the selected nodes are disconnected.

9. The system of claim 8, further comprising:
disabling, or maintaining as disabled, the option to copy the selected one or more operations of the program in response to determining the current selection of the nodes comprises the invalid portion of reusable programming logic.

10. The system of claim 1, wherein storing the selected nodes as a first reusable portion of programming logic includes:
removing one or more parameters associated with the selected nodes.

11. The system of claim 1, wherein the one or more operations of the program perform an automated email marketing procedure.

12. The system of claim 1, wherein the one or more operations include one or more of a start operation, action operation, trigger operation, rule operation, and an end operation.

13. A computer program product comprising computer-readable program code to be executed by one or more processors when retrieved from a non-transitory computer-readable medium, the program code including instructions to:
create, by a visual interface of an automation building tool, visual programming logic for a program, the visual programming logic represented as a directed acyclic graph (DAG) including a plurality of nodes, each node representing an operation to be performed by the program, the nodes being coupled together by edges to form a logical workflow, the visual programming logic being created in response to user selections of the nodes and edges;
receive, by the visual interface of the automation building tool, a first user input and a second user input, each input selecting an option displayed within the DAG to select one or more nodes of the DAG;
determine, by the automation building tool, in response to each user input, whether a combination of the selected nodes comprises a valid portion of reusable programming logic, the combination comprising all selected nodes of the DAG, and where validity of the combination is automatically determined based on applying a rule to the combination of selected nodes;
enable, by the automation building tool, an interactive option to copy the combination of selected nodes of the program on the visual interface only in response to determining that the combination of selected nodes is valid based on the applied rule;
receive, by the automation building tool, a third user input on the visual interface selecting the enabled option to copy the selected nodes; and
store, by the automation building tool, the selected nodes as a first reusable portion of programming logic.

14. The computer program product of claim 13, wherein the program code includes further instructions to:
switch the building tool from a build-mode to a select-mode in response to the first user input, the build-mode allowing the user to at least add or delete operations, and the select-mode limiting the user to only select one or more operations; and
switch the building tool from the select-mode back to the build-mode in response to the third user input.

15. The computer program product of claim 13, wherein the program code includes further instructions to:
receive a fourth user input selecting an option to insert an element into the program at an insertion point within the DAG; and
insert the stored first reusable portion of programming logic at the insertion point within the DAG in response to receiving a fifth user input selecting the stored first reusable programming logic.

16. The computer program product of claim 15, wherein the program code includes further instructions to:
provide, in response to the fourth user input, a first list of elements to add to the program at the insertion point, the first list of elements including one or more operations and an option to paste a copied portion of programming logic; and
cause a second list of stored reusable programming logic including the first reusable programming logic to be displayed in response to receiving a sixth user input selecting the option to paste the copied portion of programming logic.

17. A method comprising:
creating, by a visual interface of an automation building tool, visual programming logic for a program, the visual programming logic represented as a directed acyclic graph (DAG) including a plurality of nodes, each node representing an operation to be performed by the system, the nodes being coupled together by edges to form a logical workflow, the visual programming logic being created in response to user selections of the nodes and edges;
receiving, by the visual interface of the automation building tool, a first user input and a second user input, each input selecting an option displayed within the DAG to select one or more nodes of the DAG;
providing, in response to each user input, an indication displayed on the DAG that the one or more operations of the program has been selected;
determining, by the automation building tool, in response to each user input, whether a combination of the selected nodes comprises a valid portion of reusable programming logic, the combination comprising all selected nodes of the DAG, and where validity of the combination is automatically determined based on applying a rule to the combination of selected nodes;
enabling, by the automation building tool, an interactive option to copy the combination of selected nodes of the program on the visual interface only in response to determining that the combination of selected nodes is valid based on the applied rule;
receiving, by the automation building tool, a third user input on the visual interface selecting the enabled option to copy the selected nodes; and
storing, by the automation building tool, the selected nodes as a first reusable portion of programming logic.

18. The method of claim 17, further comprising:
switching the building tool from a build-mode to a select-mode in response to the first user input, the build-mode allowing the user to at least add or delete operations, and the select-mode limiting the user to only select one or more operations; and
switching the building tool from the select-mode back to the build-mode in response to the third user input.

19. The method of claim 17, further comprising:
receiving, via the building tool, a fourth user input selecting an option to insert an element into the program at an insertion point within the DAG; and
inserting the stored first reusable portion of programming logic at the insertion point within the DAG in response to receiving a fifth user input selecting the stored first reusable programming logic.

20. The method of claim 19, the operations further comprising:
- providing a first list of elements to add to the program at the insertion point in response to the fourth user input, the first list of elements including one or more operations and an option to paste a copied portion of programming logic; and
- causing a second list of stored reusable programming logic including the first reusable programming logic to be displayed in response to receiving a sixth user input selecting the option to paste the copied portion of programming logic.

* * * * *